(12) United States Patent
Yi et al.

(10) Patent No.: US 11,071,105 B2
(45) Date of Patent: Jul. 20, 2021

(54) METHOD AND APPARATUS FOR CONFIGURING SENSING GAP IN FRAME STRUCTURE FOR NEW RADIO ACCESS TECHNOLOGY IN WIRELESS COMMUNICATION SYSTEM

(71) Applicant: LG Electronics Inc., Seoul (KR)

(72) Inventors: Yunjung Yi, Seoul (KR); Kijun Kim, Seoul (KR); Ilmu Byun, Seoul (KR); Seungmin Lee, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 16/097,070

(22) PCT Filed: Apr. 26, 2017

(86) PCT No.: PCT/KR2017/004454
§ 371 (c)(1),
(2) Date: Oct. 26, 2018

(87) PCT Pub. No.: WO2017/188730
PCT Pub. Date: Nov. 2, 2017

(65) Prior Publication Data
US 2020/0329481 A1 Oct. 15, 2020

Related U.S. Application Data

(60) Provisional application No. 62/476,625, filed on Mar. 24, 2017, provisional application No. 62/442,394, (Continued)

(51) Int. Cl.
*H04W 72/12* (2009.01)
*H04W 16/28* (2009.01)
(Continued)

(52) U.S. Cl.
CPC .......... *H04W 72/0446* (2013.01); *H04L 5/14* (2013.01); *H04W 16/28* (2013.01); *H04W 72/02* (2013.01);
(Continued)

(58) Field of Classification Search
None
See application file for complete search history.

(56) References Cited

U.S. PATENT DOCUMENTS

| 2006/0058033 A1* | 3/2006 | Marsan ................. H04W 16/00 455/449 |
| 2008/0233960 A1* | 9/2008 | Kangude ............... H04W 36/04 455/436 |

(Continued)

FOREIGN PATENT DOCUMENTS

WO 2015186989 12/2015

OTHER PUBLICATIONS

United States Office Action in U.S. Appl. No. 16/097,132, dated Jan. 14, 2020, 11 pages.

*Primary Examiner* — Eunsook Choi
(74) *Attorney, Agent, or Firm* — Fish & Richardson P.C.

(57) ABSTRACT

A sensing gap is configured among cells for inter-cell interference coordination (ICIC) mechanism. A network node listens on a reservation signal in the sensing gap from a neighbor cell, and upon listening on the reservation signal, performs downlink (DL) transmission to a user equipment (UE) or uplink (UL) reception from the UE in a cell.

19 Claims, 13 Drawing Sheets

Related U.S. Application Data filed on Jan. 4, 2017, provisional application No. 62/438,972, filed on Dec. 23, 2016, provisional application No. 62/431,811, filed on Dec. 8, 2016, provisional application No. 62/328,000, filed on Apr. 26, 2016.

(51) Int. Cl.
*H04W 72/04* (2009.01)
*H04L 5/14* (2006.01)
*H04W 72/02* (2009.01)
*H04L 5/00* (2006.01)

(52) U.S. Cl.
CPC ....... *H04W 72/0473* (2013.01); *H04W 72/12* (2013.01); *H04L 5/0051* (2013.01); *H04L 5/0055* (2013.01)

(56) References Cited

U.S. PATENT DOCUMENTS

| | | | |
|---|---|---|---|
| 2011/0319025 A1* | 12/2011 | Siomina | H04L 5/0032 455/63.1 |
| 2013/0208587 A1 | 8/2013 | Bala et al. | |
| 2013/0322279 A1 | 12/2013 | Chincholi et al. | |
| 2014/0079015 A1 | 3/2014 | Kim et al. | |
| 2014/0094162 A1* | 4/2014 | Heo | H04W 36/0066 455/422.1 |
| 2015/0249487 A1 | 9/2015 | Harel et al. | |
| 2015/0341877 A1* | 11/2015 | Yi | H04W 56/001 370/350 |
| 2016/0183296 A1* | 6/2016 | Yerramalli | H04W 74/004 370/329 |
| 2016/0330011 A1* | 11/2016 | Lee | H04L 5/006 |
| 2017/0048861 A1* | 2/2017 | Choi | H04L 5/0053 |
| 2017/0063516 A1 | 3/2017 | Miao et al. | |
| 2017/0289869 A1* | 10/2017 | Nogami | H04W 36/08 |
| 2017/0311206 A1* | 10/2017 | Ryoo | H04W 28/18 |
| 2018/0152869 A1* | 5/2018 | Cedergren | H04W 36/06 |
| 2018/0206269 A1* | 7/2018 | Bhorkar | H04L 5/0094 |
| 2018/0227958 A1 | 8/2018 | Xiong et al. | |
| 2018/0249374 A1 | 8/2018 | Park et al. | |
| 2019/0044692 A1 | 2/2019 | Li et al. | |
| 2019/0053222 A1* | 2/2019 | Bhorkar | H04W 72/14 |

\* cited by examiner

[Fig. 1]
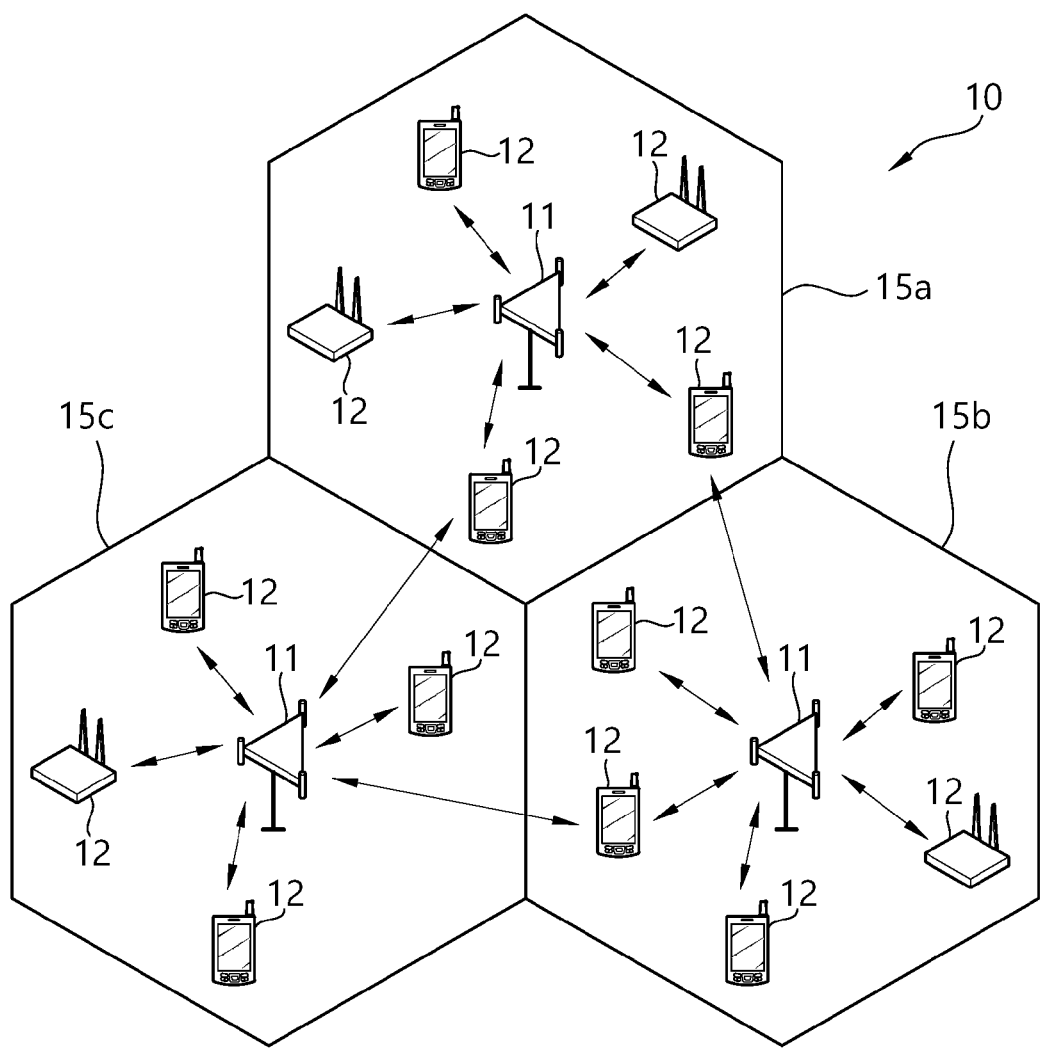
[Fig. 2]
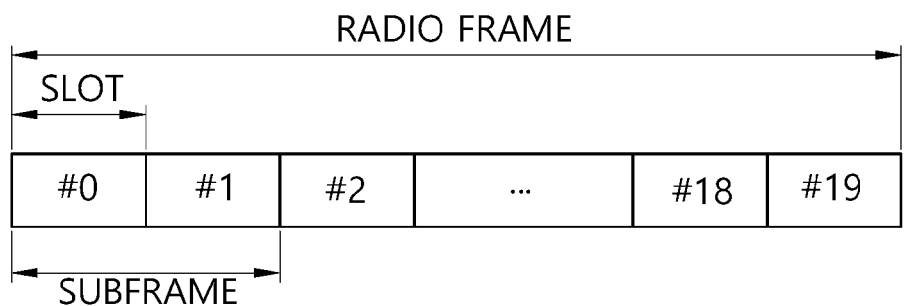

[Fig. 3]
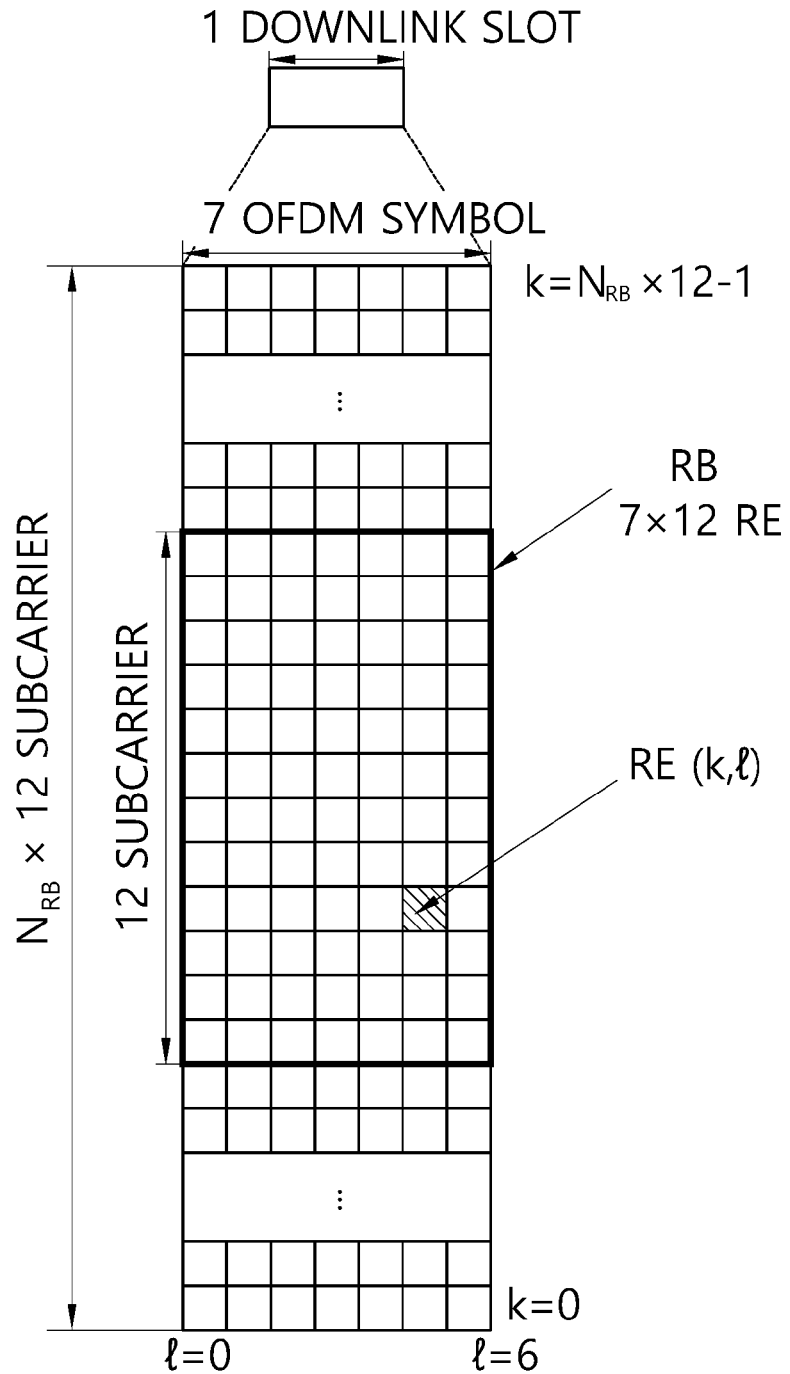

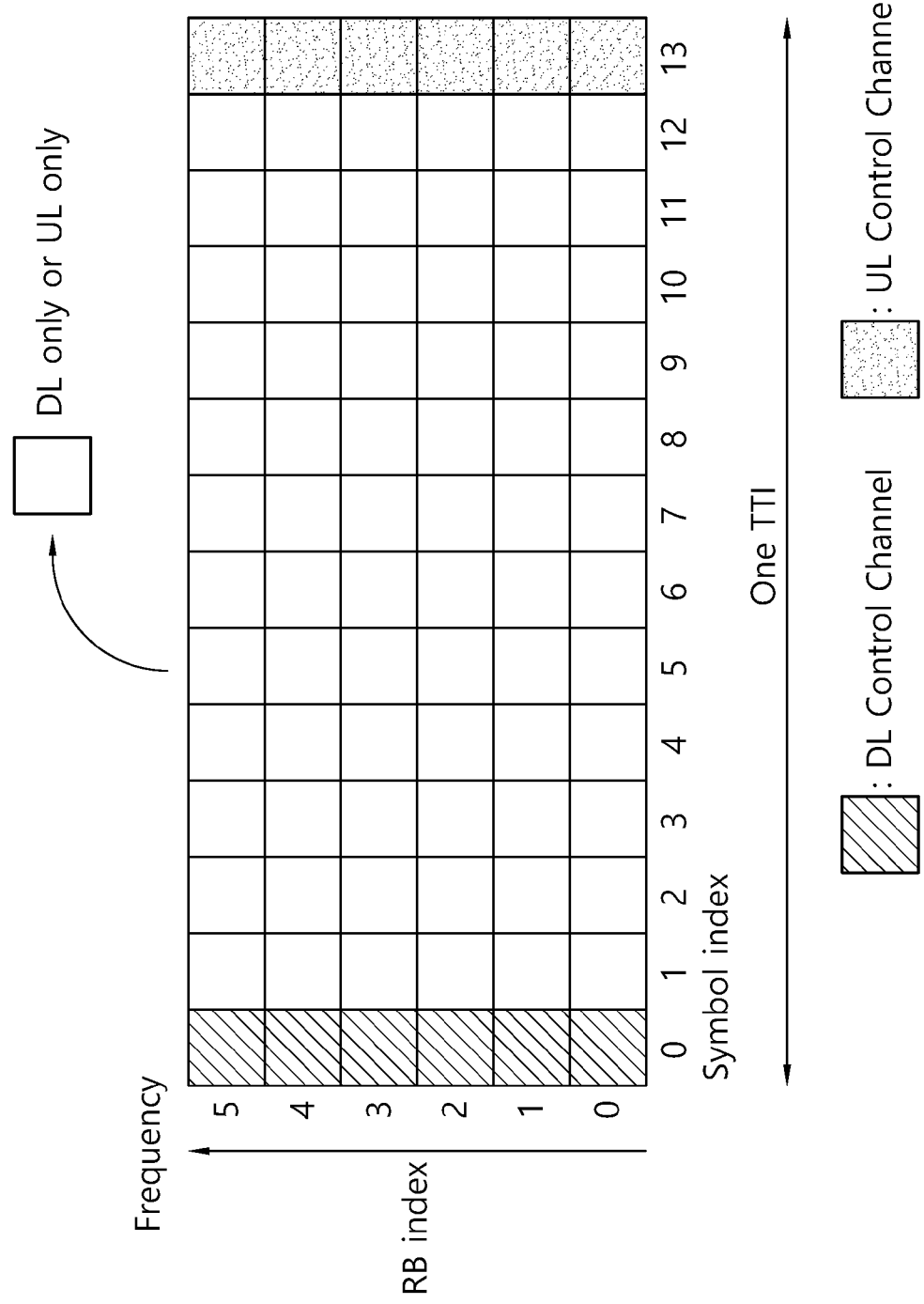
[Fig. 4]

[Fig. 5]
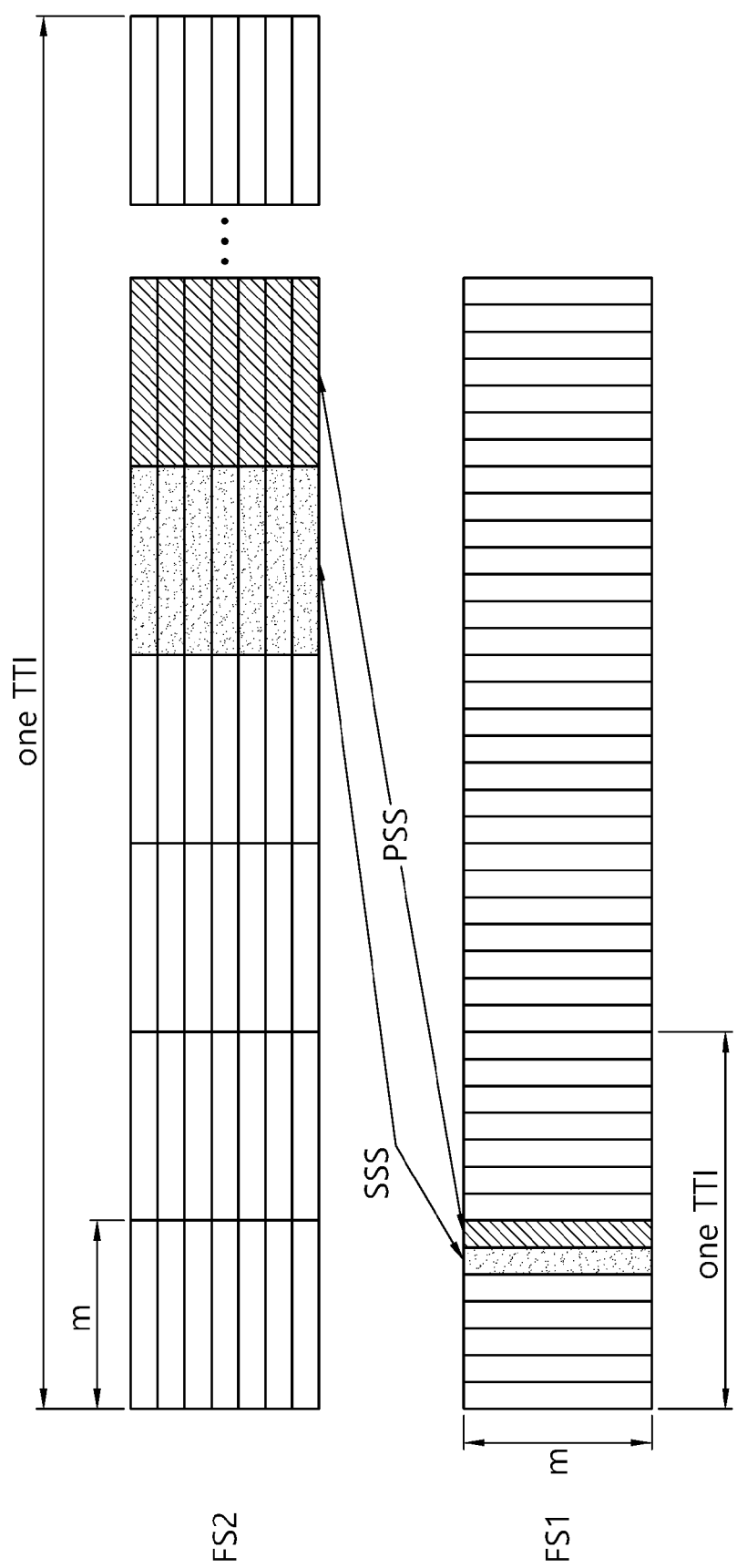

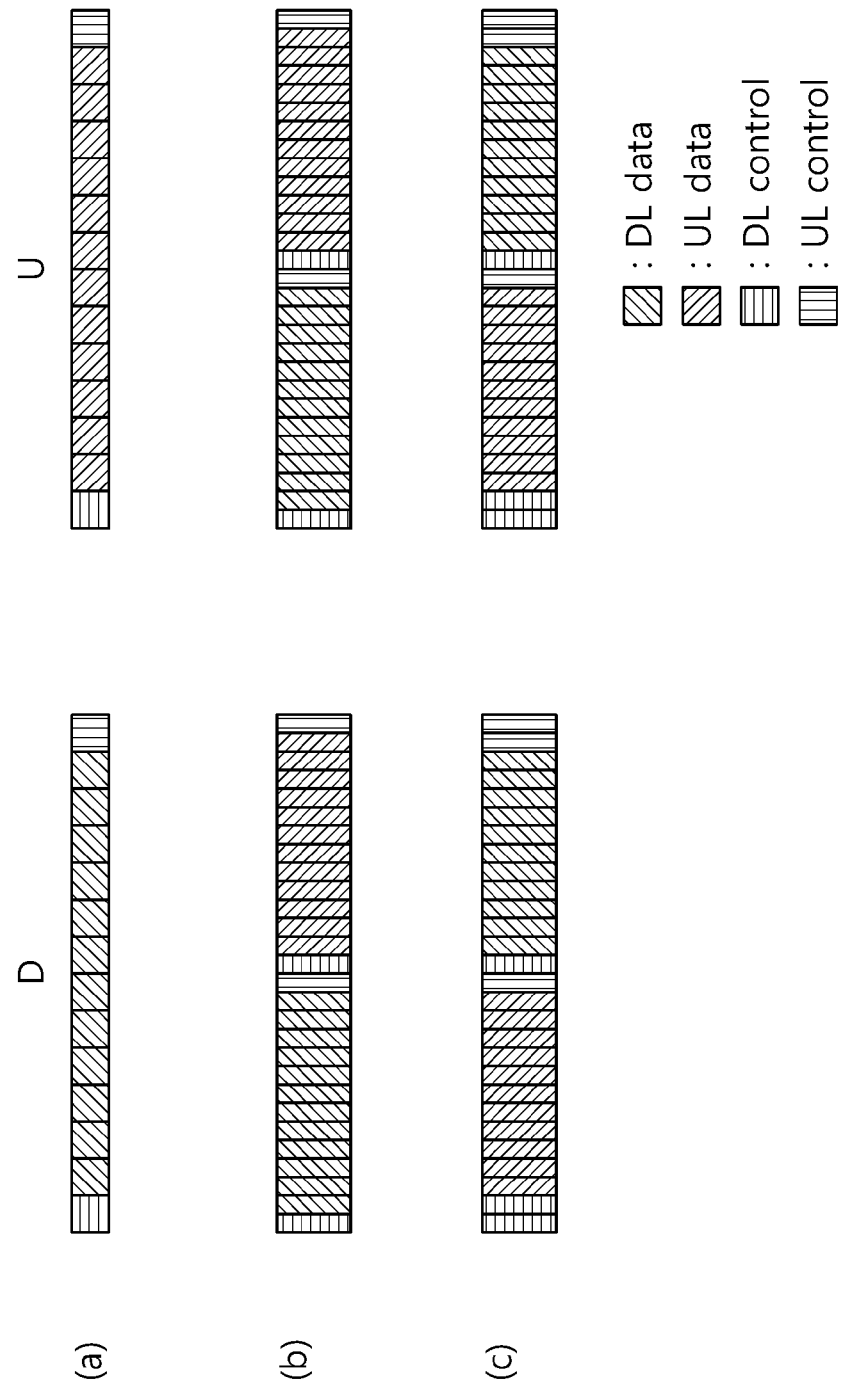
[Fig. 6]

[Fig. 7]
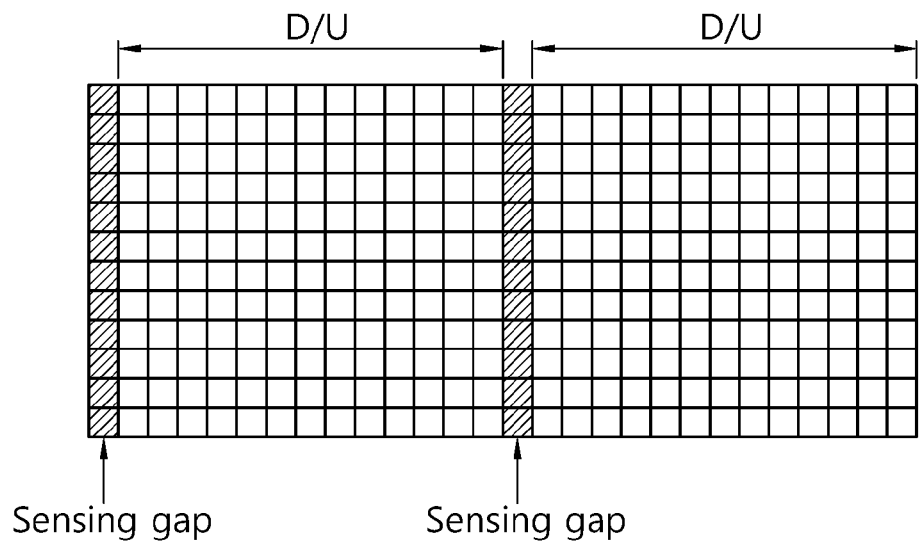
[Fig. 8]
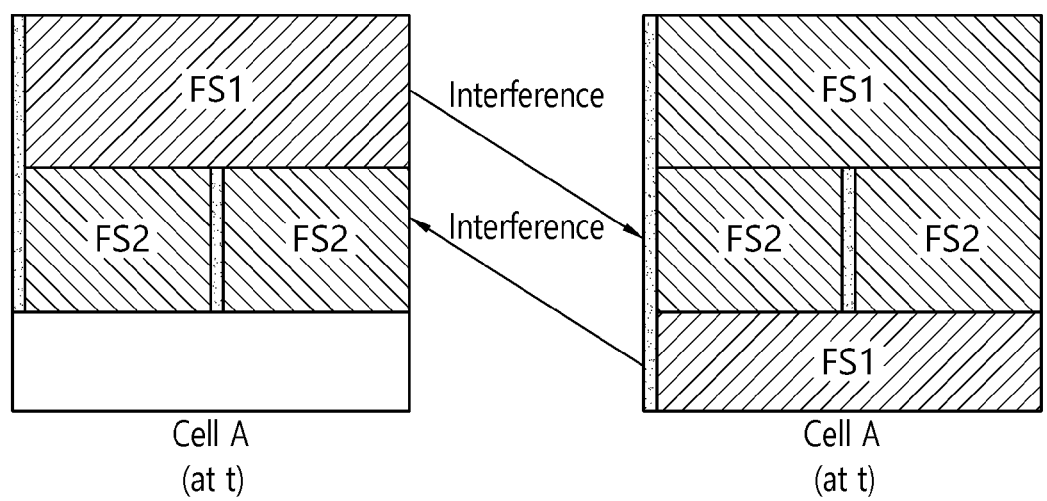

[Fig. 9]
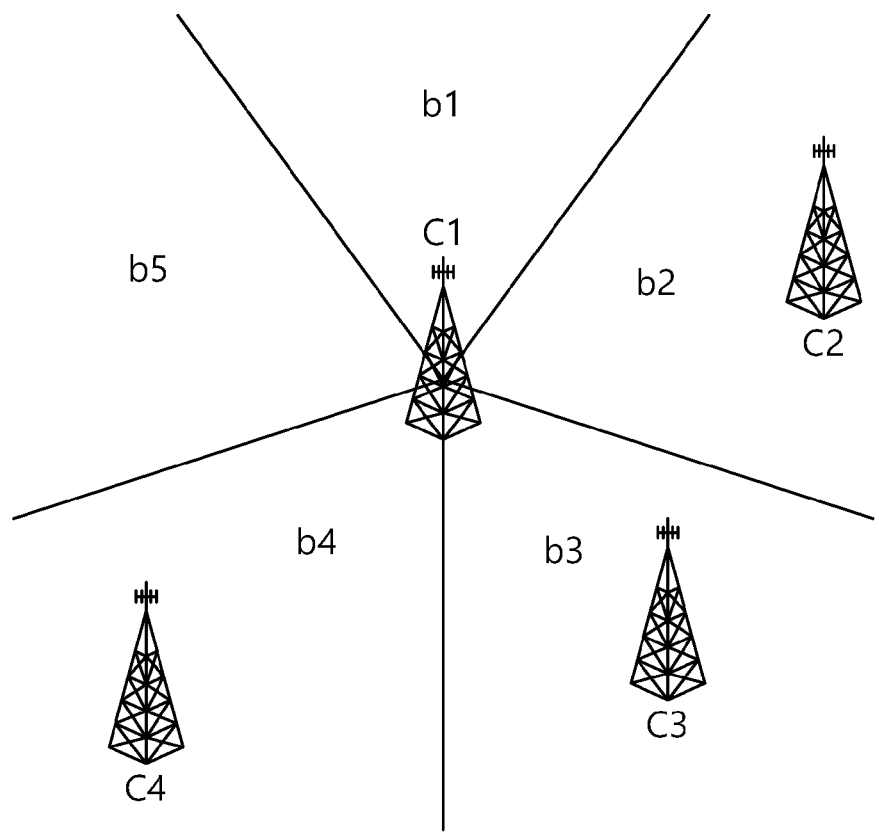

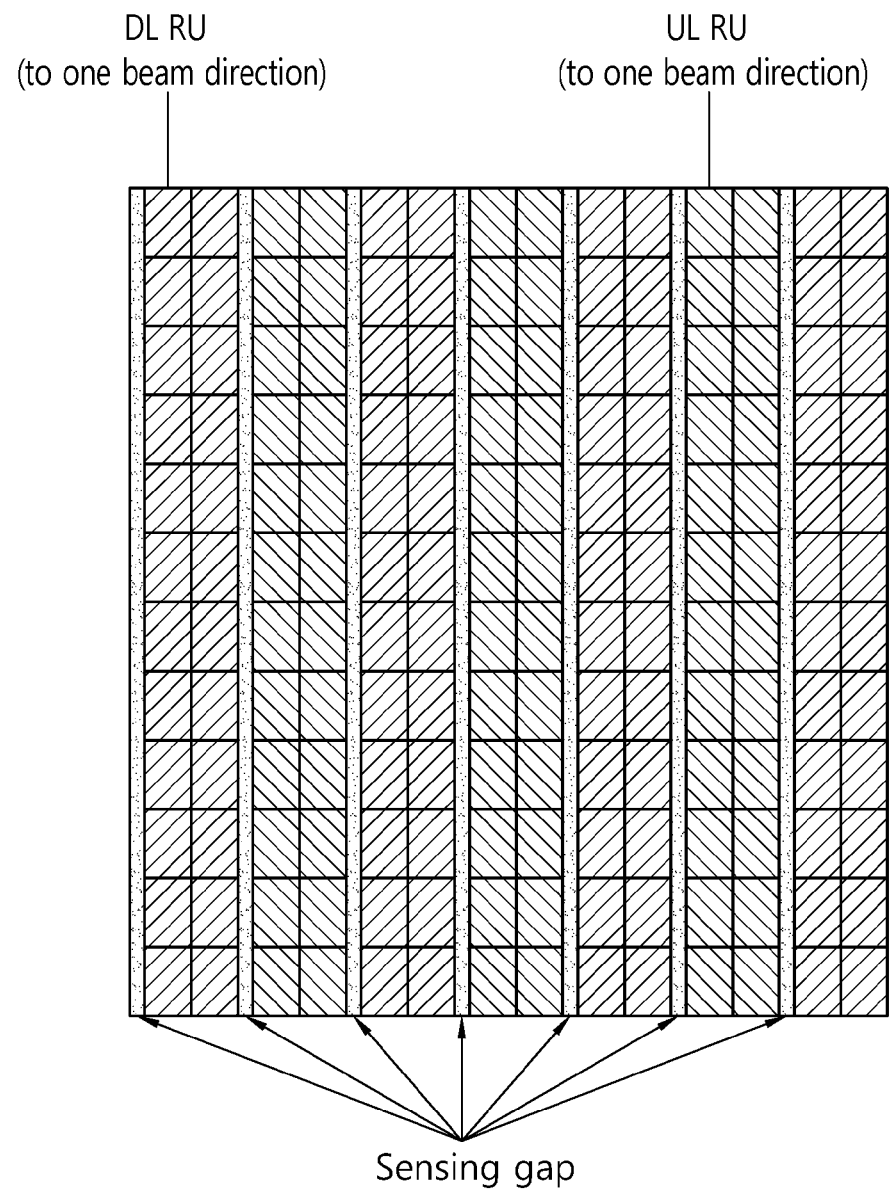
[Fig. 10]

[Fig. 11]
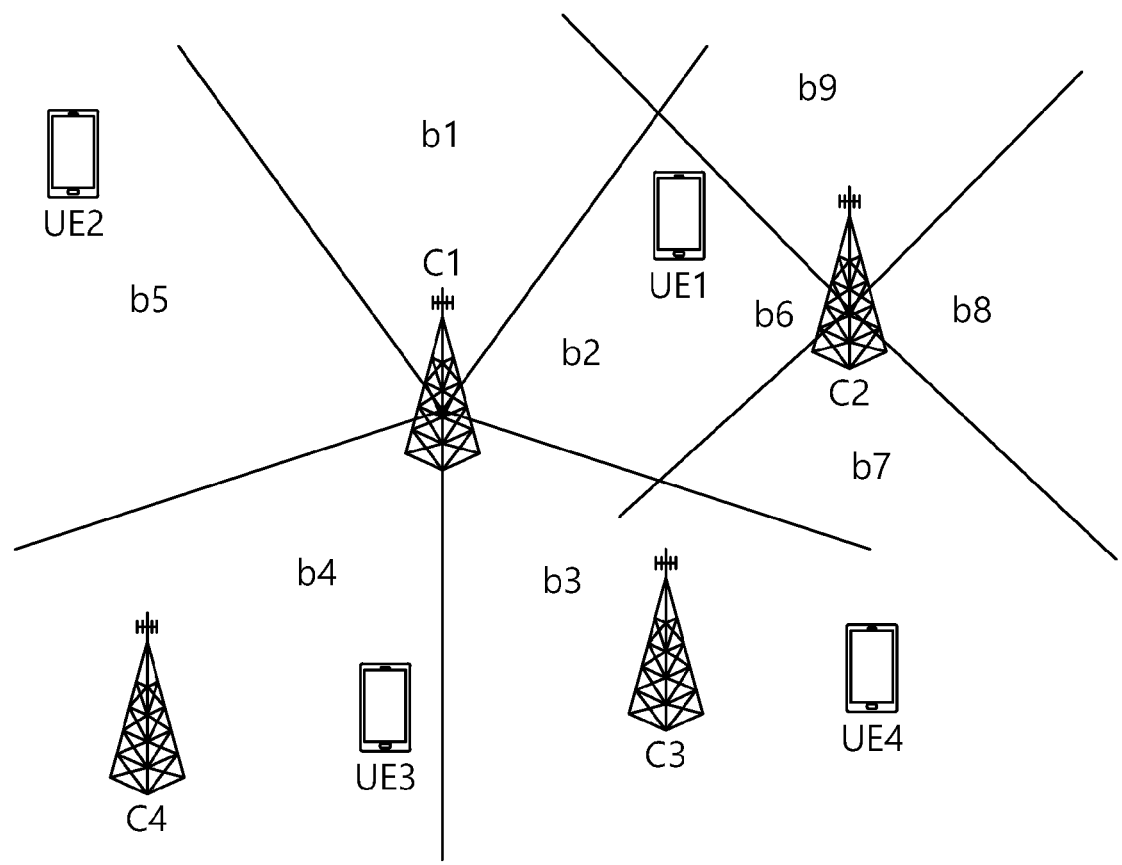

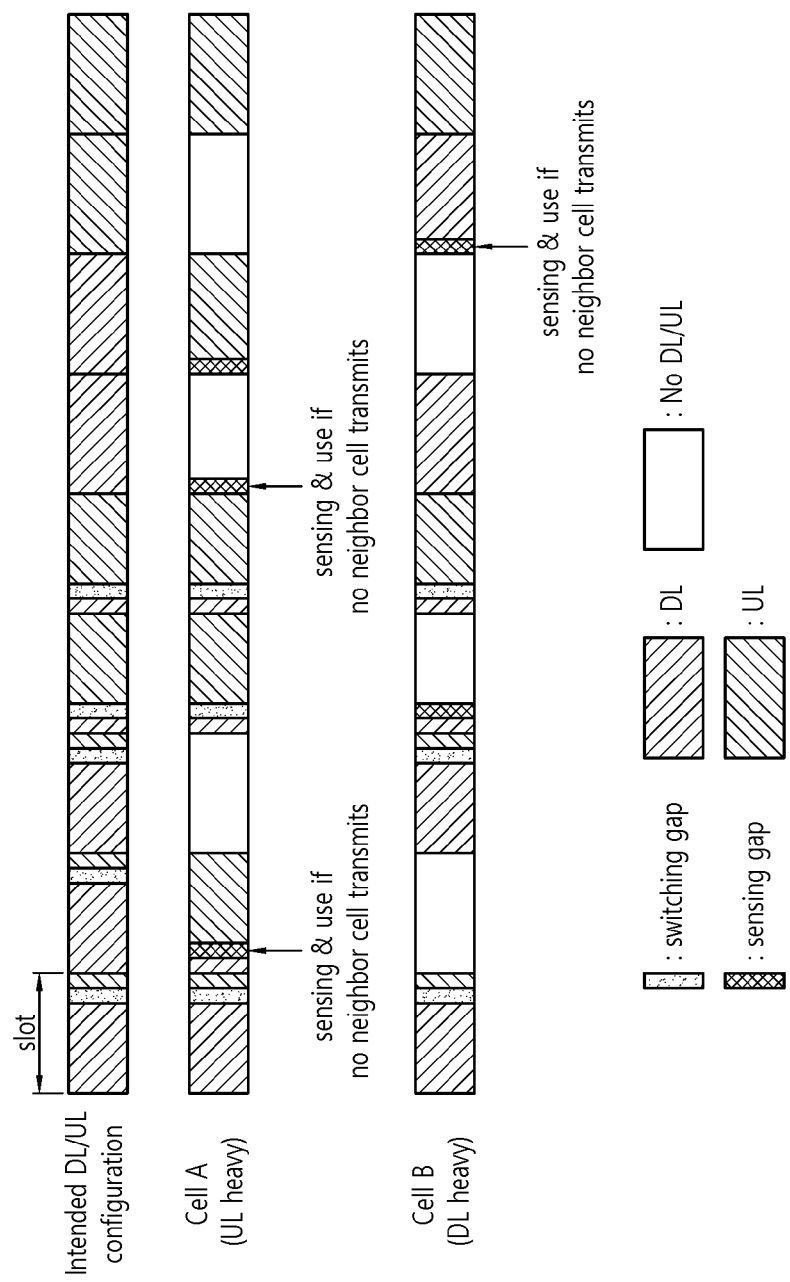
[Fig. 12]

[Fig. 13]
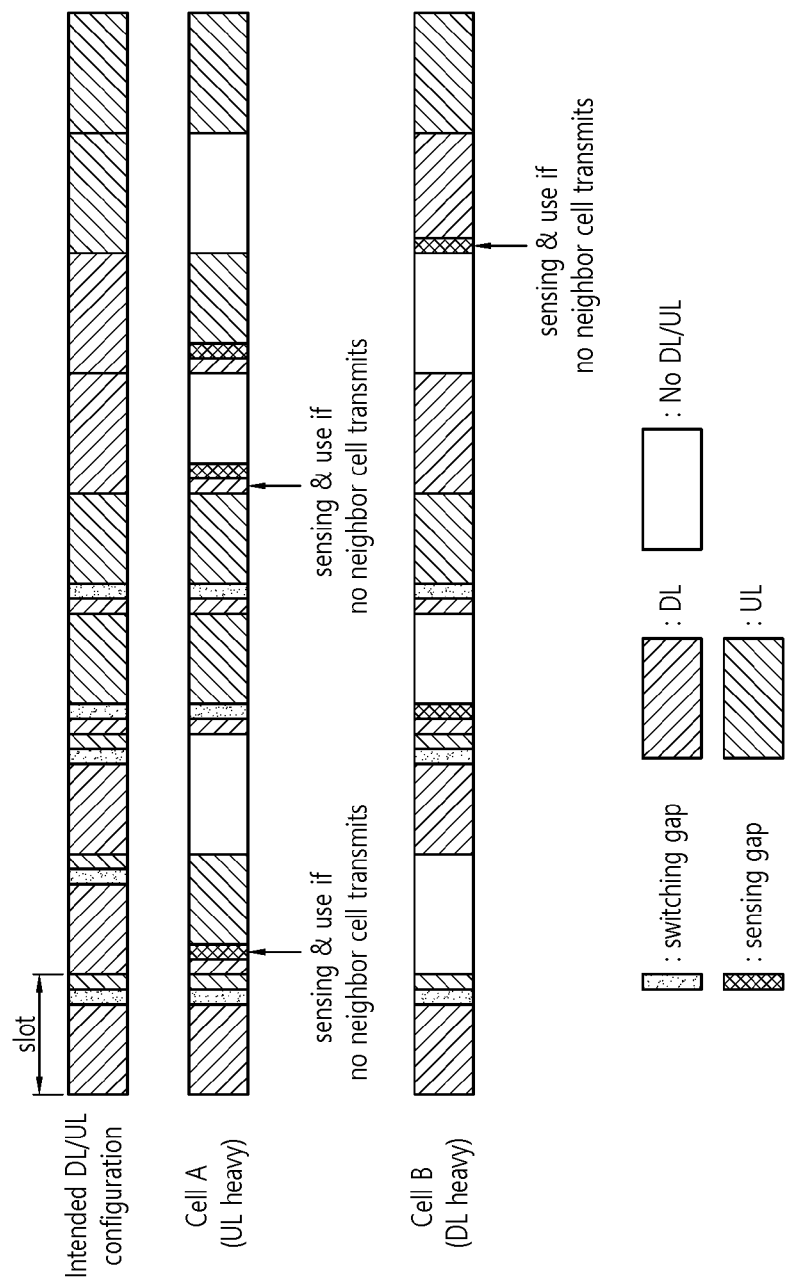

[Fig. 14]
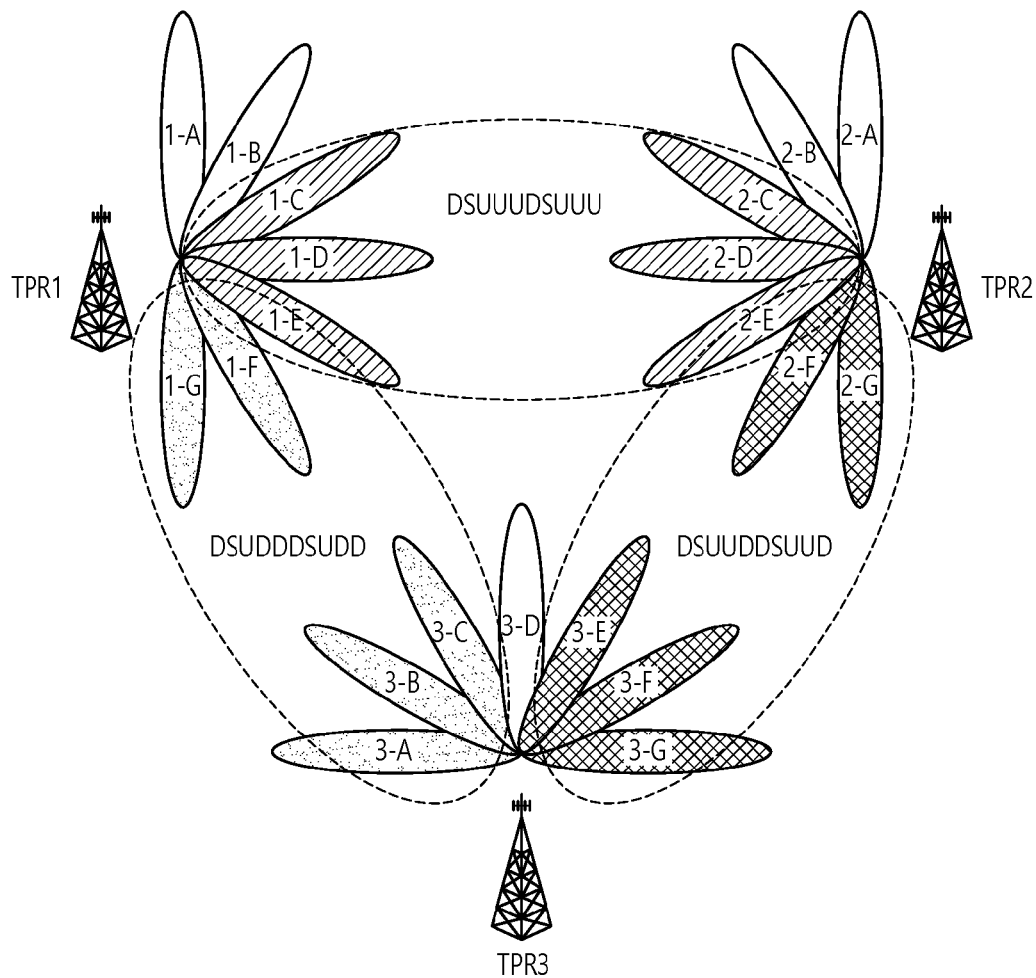
[Fig. 15]
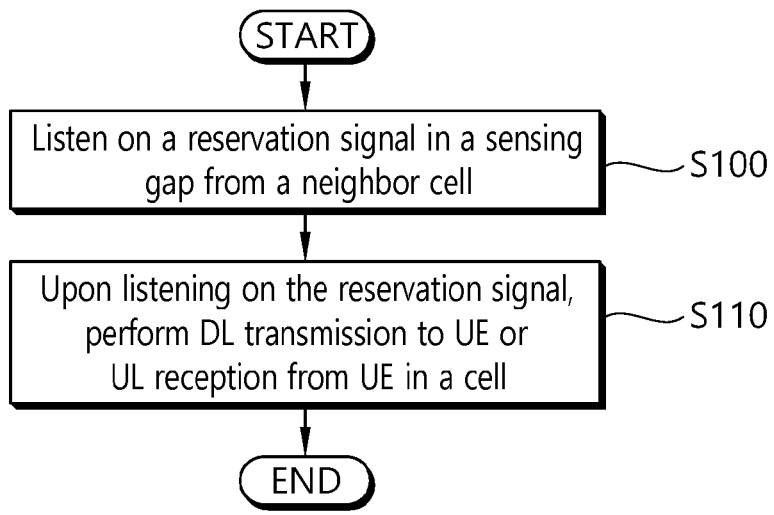

[Fig. 16]
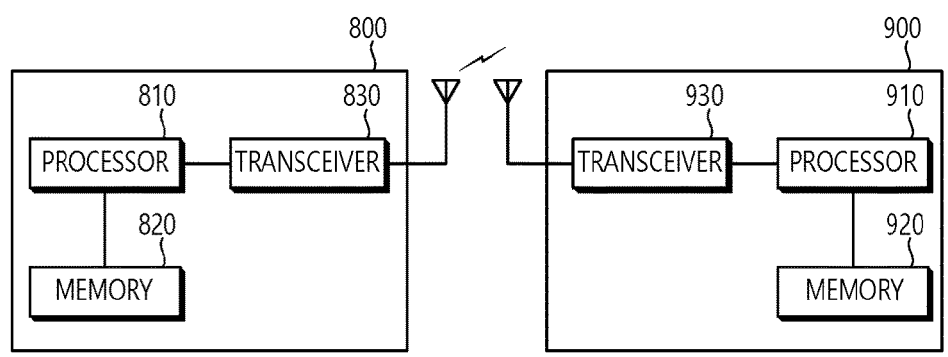

METHOD AND APPARATUS FOR CONFIGURING SENSING GAP IN FRAME STRUCTURE FOR NEW RADIO ACCESS TECHNOLOGY IN WIRELESS COMMUNICATION SYSTEM

CROSS-REFERENCE TO RELATED APPLICATIONS

This application is a National Stage application under 35 U.S.C. § 371 of International Application No. PCT/KR2017/004454, filed on Apr. 26, 2017, which claims the benefit of U.S. Provisional Application No. 62/476,625, filed on Mar. 24, 2017, 62/442,394, filed on Jan. 4, 2017, 62/438,972, filed on Dec. 23, 2016, 62/431,811, filed on Dec. 8, 2016, and 62/328,000, filed on Apr. 26, 2016. The disclosures of the prior applications are incorporated by reference in their entirety.

TECHNICAL FIELD

The present invention relates to wireless communications, and more particularly, to a method and apparatus for configuring a sensing gap in a frame structure for a new radio access technology (RAT) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have been discussed. Specifically, a new frame structure may need to be required.

DISCLOSURE OF INVENTION

Technical Problem

The present provides a method and apparatus for configuring a sensing gap in a frame structure for a new radio access technology (RAT) in a wireless communication system. The present invention discusses inter-cell interference coordination (ICIC) mechanisms for time division duplex (TDD) based new RAT design, particularly when different transmission time interval (TTI) lengths and different downlink/uplink (DL/UL) switching points are used for different services.

Solution to Problem

In an aspect, a method for performing sensing by a network node in a wireless communication system is provided. The method includes listening on a reservation signal in a sensing gap from a neighbor cell, and upon listening on the reservation signal, performing downlink (DL) transmission to a user equipment (UE) or uplink (UL) reception from the UE in a cell.

In another aspect, a network node in a wireless communication system is provided. The network node includes a memory, a transceiver, and a processor, coupled to the memory and the transceiver, that controls the transceiver to listen on a reservation signal in a sensing gap from a neighbor cell, and upon listening on the reservation signal, controls the transceiver to perform downlink (DL) transmission to a user equipment (UE) or uplink (UL) reception from the UE in a cell.

Advantageous Effects of Invention

Inter-cell interference can be avoided in a new RAT.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows an example of subframe type for new RAT.
FIG. 5 shows an example of a frame structure for a new RAT.
FIG. 6 shows another example of a frame structure for a new RAT.
FIG. 7 shows an example of a sensing gap according to an embodiment of the present invention.
FIG. 8 shows an example of interference between cells.

FIG. 9 shows an example of ICIC mechanism according to an embodiment of the present invention.

FIG. 10 shows an example of a frame structure including a sensing gap according to an embodiment of the present invention.

FIG. 11 shows an example of ICIC mechanism according to another embodiment of the present invention.

FIG. 12 shows an example of sensing according to an embodiment of the present invention.

FIG. 13 shows another example of sensing according to an embodiment of the present invention.

FIG. 14 shows an example of beam coordination according to an embodiment of the present invention.

FIG. 15 shows a method for performing sensing by a network node according to an embodiment of the present invention.

FIG. 16 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15*a*, 15*b*, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (RAT).

It is expected that different frame structure may be necessary for the new RAT. Particularly, different frame structure in which UL and DL may be present in every subframe or may change very frequently in the same carrier may be necessary for the new RAT. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In the new RAT, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in the new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for new RAT. The subframe shown in FIG. 4 may be used in TDD system of new RAT, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Further, in the new RAT, it may be considered to have different durations of TTI for different services with or without different subcarrier spacing. For example, a frame structure type 1 (FS1) may be formed to support, e.g. enhanced mobile broadband (eMBB) use cases while a frame structure type 2 (FS2) may be formed to support, e.g. mMTC. For another example, single cell transmission and SFN transmission may utilize different subcarrier spacing. In the description below, for the convenience, it is assumed that the FS1 and FS2 are configured and coexist in the same carrier. The FS1 may be a baseline frame structure used for such as for eMBB use cases or typical use cases. The FS2 may be used for some other applications such as mMTC, ultra-reliable and low latency communication (URLLC), an enhanced vehicle-to-everything (eV2X) communication. The network or a cell may support one or multiple frame structures at the same time. For the convenience, the present invention may discuss relationship between two frame structures. However, more than two frame structures may be supported simultaneously. Further, eNB in the description below may be replaced by gNB which is entity of the new RAT. The eNB may refer any network entity relevant in each communication protocol framework without the loss of generality.

FIG. 5 shows an example of a frame structure for a new RAT. Referring to FIG. 5, frame structures utilizing different subcarrier spacing in potentially different subbands are described. It is shown that FS1 is the same as the conventional frame structure, as one TTI includes 14 symbols. That is, one TTI of FS1 is 1 ms. On the other hand, one TTI of FS2 is 'm' ms. 'm' may be predetermined. Or, 'm' may be determined based on subcarrier spacing used for mMTC.

FIG. 6 shows another example of a frame structure for a new RAT. FIG. 6-(*a*) shows an example of FS1 which corresponds to the self-contained subframe structure. FIG. 6-(*b*) and FIG. 6-(*c*) show an example of FS2 in which different number, positions, duration of DL/UL switching points and DL/UL portions may be expected depending on subcarrier spacing or TTI length.

Using different frame structure and/or numerology may not be a big problem in FDD case as the interference of DL/UL transmissions between intra-cell transmissions and inter-cell transmissions may not be mixed. However, if TDD type of frame structure is considered, these may imply that different DL/UL switching points among neighbor cells and also between subbands within a cell or in the frequency band may occur. This may impact considerably interference to neighbor cells unless all interfering cells are aligned. Furthermore, this may also impact adjacent carrier options. Also, it may become difficult to multiplex different TTIs or different subcarrier spacing with different DL/UL switching in the same time from a cell perspective, which may limit the flexibility.

Hereinafter, the present invention discusses how to handle these cases in the same cell, among neighbor cells with ideal backhaul and among neighbor cells without ideal backhaul via such as clustering, adjacent carrier. For this, required signaling and UE behaviors are proposed according to embodiments of the present invention.

In terms of inter-cell interference coordination (ICIC), the following approaches may be considered.

1. Via sensing/reservation, full duplex capability may be utilized to protect from interference. The same numerology may be used at least in the same time/frequency resource. Alternatively, different numerology may be supported, and in this case, actual numerology type needs to be known via backhaul signaling or other means among networks/cells.

According to an embodiment of the present invention, in each resource unit (RU) where the network can transmit and/or receive transport block (or in subframe/slot/TTI, i.e. scheduling unit), each cell may start UL transmission before initiating DL transmission which may be used for sensing gap.

FIG. 7 shows an example of a sensing gap according to an embodiment of the present invention. Referring to FIG. 7, a sensing gap is configured in each of RU/subframe. Each of RU/subframe may be used for DL or UL. If a cell has any UL transmission expected, the cell with full duplex capability may transmit a reservation signal in the sensing gap.

Other cells may not have any UL transmission upon listening on the reservation signal in the sensing gap. In terms of reception, the reception bandwidth may be the entire system bandwidth or restricted to subband in which the cell wants to transmit DL and duplex gap or gap to protect other cells' UL transmission or only subband intended for DL transmission. As the cell is equipped with full duplex capability, a cell may also transmit the reservation signal in different subband from monitoring/sensing subband. Transmission of the reservation signal may be restricted to the intended UL subband only, or optionally including a necessary gap to protect UL transmission from other DL transmission of neighbor cells.

FIG. 8 shows an example of interference between cells. There may be interference from adjacent subbands DL transmission of neighbor cell(s) to one cell's UL transmission. As shown in FIG. 8, DL transmission of cell A with FS1 may interfere with UL transmission of cell B with FS2, and DL transmission of cell B with FS1 may interfere with UL transmission of cell A with FS2. In terms of sensing/reservation, some consideration of such potential interference from adjacent subbands should be taken.

To address the above issue, monitoring/sensing subband for DL may be enlarged. For example, for DL transmission of cell A with FS1, in addition to monitor/sense DL subband, gap may be configured for potential interference mitigation. The necessary gap may be defined based on FS1 DL power and/or the bandwidth of DL transmission. Alternatively, the reservation signal may be transmitted with wider bandwidth to protect more bandwidth than required UL bandwidth. To support this, at least time/frequency resource with the same numerology among neighbor cells may be aligned. Otherwise, more complicated sensing may be necessary.

If a cell detects energy or reservation signal(s), the ell may assume that at least one neighbor cell performs UL transmission in this TTI or resource unit. Then, the cell may perform DL transmission with very low power to minimize interference on neighbor cells' UL transmission. Otherwise, the cell may assume that there is no UL transmission in neighbor cells, thus, DL transmission with full power may be possible.

The sensing gap may be configured with one OFDM symbol or with very short time. Similar mechanism may be applied to eNBs without full duplex capability. In this case, each cell may transmit reservation signals and UE may start UL transmission after the sensing gap. If reservation signal or energy is detected, the cell may perform DL transmission with reduced power or may not perform DL transmission. This may also be expanded to analog beam forming case.

FIG. 9 shows an example of ICIC mechanism according to an embodiment of the present invention. Referring to FIG. 9, if cell 1 (C1) supports 5 different beam directions (i.e. b1 to b5), before transmitting any signal, the cell 1 may listen on any reservation signal from neighbor cell(s). Depending on its intended beam direction, the intended neighbor cell may be different. For example, if cell 1 intends to transmit signals with beam b1, and detects reservation signals from cell 2, the cell may transmit signals with b1. But if cell 1 intends to transmit signals with beam b2 while it detects reservation signals from cell 2, it needs to consider this case as potential collision, and defer transmission of signals with beam b2.

More detailed procedure is as follows.

(1) Each TTI or RU, which is defined as time duration where one cell or one UE uses the same beam direction to transmit data channel, may contain the sensing gap.

FIG. 10 shows an example of a frame structure including a sensing gap according to an embodiment of the present invention. Referring to FIG. 10, the frame structure includes DL RUs, which are used for DL transmission and corresponds to one beam direction, UL RUs, which are used for UL transmission and corresponds to one beam direction, and sensing gap between DL RUs and UL RUs.

(2) If the cell is intending on UL transmission in each RU, the cell may transmit a reservation signal. To support beam direction management, the reservation signal may also carry system cell identifier (ID) or related information to differentiate which cell is transmitting the reservation signal. Each cell may exchange information including potential measurements by network coordination or backhaul message, and accordingly, the cell may know potential interfering cells per each beam direction.

(3) Before transmitting signals with each beam direction, the cell may first search reservation signal(s) from potential interfering cell(s). If the cell detects reservation signal from interfering cell(s), the cell may defer DL transmission or change the beam direction. To change the beam direction, all cells may need to be detected which cell transmits reservation signals.

(4) As all transmitter needs to be heard by the reservation signal, the reservation signal may be transmitted with omni-direction, with potentially lower coverage compared to beam-formed transmission.

If RU between UL and DL is different, RU on UL may be used as the main motivation is to protect UL transmission.

The operation described above may be performed per time/frequency resource sharing the same numerology or same RU or same DL/UL switching points or same TTI length. In summary, the followings may be considered.

DL RU may include time duration, and physical downlink shared channel (PDSCH) or DL data may be transmitted without DL/UL switching points in between. DL RU may include downlink control information (DCI) and DL RU may transmit only DCI.

UL RU may include time duration, and physical uplink shared channel (PUSCH) or UL data may be transmitted without DL/UL switching points in between. UL RU may include uplink control information (UCI) and UL RU may transmit only UCI.

In each RU, (interference) sensing gap may be configured, and the duration of sensing gap may be different or same from one OFDM symbol length or may be very short depending on whether sensing is done based on energy or signal detection. Numerology for reservation signal may be different.

The reservation signal may be transmitted per subband or time/frequency resource of one numerology or based on the network configuration. For the simplicity, it may be desired to use the same frequency with same numerology among neighbor cells. Different reservation or sensing gap may be placed depending on RU size.

If the network wants to perform UL transmission at one RU, the network may first transmit reservation signal.

If the network wants to perform UL transmission and thus transmit reservation signal, regardless of neighbor cell has UL transmission or not, the network may always perform DL transmission with low power or may not perform DL transmission.

If the network wants to perform DL transmission, the network may listen on reservation signal, then if no reservation signal is detected, may perform DL transmission with full power. Otherwise, the network may perform DL transmission with reduced power or may not perform DL transmission.

2. Alternatively, dynamic signaling of DL/UL switching direction among cells may be utilized. That is, instead of transmitting the reservation signal, actual intended direction over RU(s) may be dynamically indicated via L1 signaling. For example, the first symbol of each RU may be reserved for this indication. Each cell may transmit the subframe type on the corresponding RU in this region which can then be read by neighbor cells. If cells do not support full duplex capability, subframe type of neighbor cells may be broadcast by clustering type of operation.

The techniques described above according to the present invention may be applied to UE-specific manner. For example, each UE may transmit reservation signal before receiving data from a cell, and neighbor cells or cells intending transmission to the UE direction may reduce the power or stop DL transmission. The direction or location of each UE may be known by periodic reporting of location and/or other means of localization or feedback mechanism.

FIG. 11 shows an example of ICIC mechanism according to another embodiment of the present invention. Referring to FIG. 11, UE 1 may transmit a reservation signal at one point, then cell 2 may not use beam direction of b6 or reduce the power to protect transmission from cell 1 with beam direction of b2. If this is used, intended beam direction may need to be informed in advance. Further, the UE may transmit reservation signal before UL transmission. For example, UE3 may transmit towards cell 1, and transmits the reservation signal towards cell 1. When cell 2 detects reservation signals, it may assume there are UE(s) transmitting to some neighbor cells, and thus, cell may reduce the power or stop DL transmissions. Alternatively, reservation signal may be transmitted to protect DL transmission by a cell. Upon detecting the reservation signal, other cells may perform necessary function (e.g. do not transmit any DL to protect UE reception or perform DL transmission only or increase UL power, etc.).

If a dynamic adaption is not assumed, some coordination among neighbor cells may be used. Similar to TDD, DL/UL configuration or fixed DL and fixed UL among neighbor cells may be aligned per time/frequency resource sharing the same numerology. Particularly, in TDD type operation, the same numerology may be used among neighbor cells in the same time/frequency resource.

The coordination may be achieved per resource. RUs, not aligned among neighbor cells as either fixed DL or UL, may be used for DL or UL. In case DL or UL, necessary power control may be used to mitigate interference issue.

3. Details of Sensing Mechanisms

As described above, to support dynamic change of DL/UL direction, sensing mechanism may be considered, and sensing may be done by either aggressor or victim. In terms of details of sensing mechanisms, the following approaches may be considered.

(1) Intended DL/UL configuration may be coordinated, and by the intended DL/UL configuration, basic resource unit in which DL or UL configuration or DL centric or UL centric resource direction is determined may be configured. The cells which follow the intended DL/UL configuration and have any intention to schedule DL or UL transmission may first transmit the reservation signal at the determined time/frequency location, and the cells which may not follow the intended DL/UL configuration may sense the reservation signals at the determined time/frequency resource. The determined time/frequency resource for the reservation signal may be the first OFDM symbol. The reservation signal may be replaced by the existing signal such as demodulation reference signal (DM-RS), control channel, channel state information reference signal (CSI-RS), etc., or separate signal/channel may also be used.

The reservation signal may be transmitted even though the cell may have intention to use only very partial resource. For example, DL/UL configuration may be configured per slot where the reservation signal is transmitted in every slot, and one cell may transmit the reservation signal if it intends to transmit any mini-slot within a slot or CSI-RS in a slot, etc. To increase resource efficiency, even though DL/UL configuration is done per slot, the reservation signal may be transmitted in a mini-slot level (or different or smaller resource unit scale). The positions where sensing needs to be occurred may also be coordinated among cells via dynamic or backhaul signaling.

(2) Intended DL/UL configuration may be coordinated among cells and the cells which does not follow the intended DL/UL configuration may perform sensing before they change its transmission direction. The intended DL/UL configuration may also be indicated to UEs, and UEs may perform sensing before transmitting UL signals at the intended DL resource. In other words, at resources where the transmission direction follows, the intended DL/UL configuration may trigger transmission without any sensing or measurement. Only if the transmitter changes its direction against intended DL/UL configuration, sensing/measurement may be performed before transmission, and if there is on-going transmission, transmission according the intended direction may be performed. Or, data may be transmitted with lower power possibly depending on the detected energy/signal level. When different direction is used, sensing/measurement gap may be used which may be blank resource with or without explicit configuration. Thus, control channel may be transmitted after sensing gap in case of DL.

When different numerology or mini-slot is used by neighbor cells, sensing gap needs to be occurred aligned with different numerology or mini-slot. For example, if neighbor cell uses double subcarrier spacing which defines ½ times of slot duration compared to intended DL/UL configuration reference numerology, neighbor cells wanting to change the transmission direction may need to perform two times of sensing at each slot of the neighbor cells. If neighbor cells uses mini-slot, it may also need to perform sensing at mini-slot boundaries. This assumes that cells are synchronized each other. If synchronization is not assumed, the sensing may need to be occurred at different timing.

It is possible that the sensing gap may fall into the blank resource of neighbor cells. For example, among new RAT coexisting with LTE in the same frequency block, the first few OFDM symbols may be blanked to avoid legacy PDCCH region of LTE in MBSFN subframes. In this case, sensing gap needs to be occurred at the first valid OFDM symbols, and neighbor cells may start its transmission. In other words, sensing gap may vary depending on blank resource configuration of neighbor cells. In this sense, either by rule (e.g. legacy PDCCH region is blank resource in case LTE and new RAT coexist in the same frequency) or by backhaul signaling or some other means, blank resource of neighbor cells may need to be informed. This may be applied to the UEs as well as to network at least in case UEs perform sensing. One example of UE sensing is to utilize the resource for sidelink operation. In terms of sidelink resource, sidelink transmission may have lower priority over wireless access network (WAN) transmission such that sidelink transmission first performs sensing before transmission. Or, sidelink may have higher priority on resources configured/dedicated to sidelink, and WAN transmission may occur after sensing. Overall, sidelink and WAN transmission may coexist similar to DL-UL coexistence.

(3) Instead of fixing intended DL/UL configuration, priority per slot on DL or UL (or SL) may be defined. In each slot with DL prioritized, UEs scheduled to transmit or cells scheduling UL grant may perform sensing to see whether any DL transmission is on-going. In each slot with UL prioritized, cells or UEs (including SL UEs) may perform sensing to see whether any UL transmission is on-going. When mini-slot or different numerology is used, priority list on DL or UL or SL may be based on a reference numerology which may also be defined in the list/configuration or based on a fixed value (e.g., 15 kHz normal CP). Cells/UEs may perform sensing at each resource unit based on reference numerology or reference scheduling unit size or resource unit size for priority. In case multi-slot scheduling is used, sensing gap may be assumed as blank resources, and whether the scheduling continues or not may be indicated dynamically via signaling such as common signal to indicate the availability of the resource. For example, when the cell detects that the resource is idle, then the cell may transmit a common signal (in case of DL) to indicate whether the resource is available. For the UL transmission or SL transmission, similar approach may be considered. For sensing period, it may also be possible that sensing period or unit size of priority may be based on the size of multiple slots instead of mini-slot or single slot. Similarly, different granularity may be considered for intended DL/UL configuration.

Regardless of whether to indicate intended DL/UL configuration or priority list, detailed examples/concepts may be applicable to either concept. The general concept is to define primary and secondary users. The primary user may be a cell or UE following intended DL/UL configuration or priority list, and the second user may be a cell or a UE which intends to use opposite or different direction from the intended DL/UL configuration or priority list.

(4) Primary and second users may be fixed semi-statically or in a fixed manner or per frequency region. For example, in LTE frequency spectrum, LTE may be a primary user and new RAT may be a secondary user. In such a case, secondary user may perform sensing following DL/UL configuration of the primary user or resource usage of the primary user. Another example may be sidelink and WAN transmission (depending on the priority).

(5) Primary and second users may be defined per slot or per resource. Instead of fixing primary/second users on the resource permanently, resource may be divided, and different primary user may exist per resource.

4. Handling Control and Data

In case control region is fixed (e.g. first few OFDM symbols), the followings may be considered.

If slot type is indicated by a common channel, sensing by reading the common channel from a neighbor cell may indicate the usage of the slot direction. In this case, UL-centric or UL slot type in intended DL or high priority DL resource may be treated as aggressor or interferer. Any interference mitigation technique may not be triggered to protect aggressor or interferer. In case all cells may have the same priority (e.g. in a flexible resource or resource without any specific priority to any direction), all cells may be victim and aggressor at the same time, and thus, necessary interference mitigation techniques are enabled.

If slot type is indicated by scheduling, sensing needs to be occurred at data portion as well to check whether any data has been scheduled or not (unless the cell can decode all control channels). In this case, data portions of each cell may be either aligned, or at least the latest OFDM symbols in which data can start may need to be negotiated or assumed. For example, if the maximum control region size is 3 OFDM symbols, then, 4th OFDM symbol may be used for sensing for any DL transmission in DL intended or DL prioritized resource or 5th OFDM symbol may be used for sensing for any UL transmission in UL intended or UL prioritized resource, assuming 1 OFDM symbol switching gap. The position of sensing gap may also be indicated by the cell or negotiated among cells. By configuring the sensing gap at the first (possibly the latest starting OFDM symbol), the usage of resource to different direction may be restricted. In this sense, it may be desirable to fix or indicate via common signal or configured by higher layer signaling the start of data region. With dynamic change of control region, starting position of aggressor cell may be changed. This may be indicated via a common signal from the aggressor cell or indicated via special signal or blindly detected by a UE or handled by scheduling.

FIG. 12 shows an example of sensing according to an embodiment of the present invention. Referring to FIG. 12, if intended DL/UL configuration is given D'D'D-'U'U'DDUU, where D' means DL centric and U' means UL centric, a cell A (UL heavy cell) may perform sensing at DL centric slot, and the sensing gap may be placed after control region to detect data region. Control region at cell A may be still used for control transmission. In other words, sensing gap may be placed where data can start. If control region is not allocated or not used, sensing gap may be placed in the first OFDM symbol.

FIG. 13 shows another example of sensing according to an embodiment of the present invention. If control region is also used in DL slot as well, the sensing gap may start after control region.

If common signal is used for slot type indication, sensing gap may be placed in the symbol where common signal is transmitted. For the cells changing its direction may transmit common signal after sensing gap (i.e. common signal location/position may change). When a cell detects any neighbor cell with DL or DL-centric in the intended DL or DL prioritized resource, the cell may perform interference mitigation (e.g. power reduction or not schedule any UL data, etc.). A UE may also perform sensing at DL resource before transmission, and a common signal from neighbor cells may be read. Alternatively, the cell may perform sensing even for UL transmission, and transmit grant or confirmation signal if the resource becomes available. UEs may transmit UL transmission at the intended DL resource only when grant or confirmation has been received from the serving cell.

5. Handling Sensing Gap with Switching Gap (DL→UL or UL→DL)

When sensing is used, the network requires to perform DL→UL switching. Thus, sensing gap for the network should cover sensing duration and DL→UL switching latency. If only energy sensing is used, remaining portions from a symbol or switching gap may be used for sensing period instead of increasing the sensing gap to minimize the overhead.

For the UE, sensing gap needs to cover sensing duration, DL→UL switching latency and timing advance (TA). In this case, sensing gap may be larger than DL→UL switching latency. Thus, when a UE performs sensing, additional gap may be added to DL/UL switching gap. To allow this, a UE may perform puncturing of one OFDM symbol in case DL/UL switching gap is not sufficient. If the switching gap is sufficient for a UE to accommodate switching latency and sensing gap (e.g. TA is small, or UE switching latency is small), sensing may occur within the switching gap. In such a case, puncturing may not be performed.

Another issue on sensing is that UEs/cells may have different bandwidth to transmit. For example, in intended DL resource, only partial PRBs may be used by the cell. If energy sensing is used, the overall energy level averaged over the entire system bandwidth may be low. Moreover, the bandwidth between UE and network and between networks may be different in such case, so energy sensing bandwidth needs to be fixed. To mitigate this issue, the following approaches may be considered.

(1) Regardless of system bandwidth or UE bandwidth, sensing bandwidth may be configured. The sensing bandwidth may be smaller than system bandwidth or UE bandwidth. Otherwise, UE/network RF may not support sensing bandwidth. Alternatively, sensing bandwidth may be fixed, which is supported by the all UEs/network as a mandatory feature. In this configured bandwidth, measurement RS for sensing may be transmitted by the victim.

(2) Sensing may be performed only in intended PRBs where data would be transmitted (i.e. interference may occur).

(3) Energy sensing may use best signal to noise and interference ratio (SINR) of PRBs instead of average SINR of PRBs. In other words, as long as at least one PRB is utilized by the victim cell/UE, channel may not be changed.

(4) Energy sensing may be performed per PRB level instead of average or instead of system bandwidth level. To minimize the overhead, PRBs may be grouped, and sensing may performed per PRB group level. Based on the sensing result per PRB group, the interferer may determine whether the resource are usable or not. For sensing, the size of PRB group may be configured or fixed or may be defined based on system bandwidth or UE bandwidth. Or, victim may indicate its PRB bundling and/or grouping size for resource allocation via backhaul signaling.

In terms of utilizing resources based on sensing results, change of DL to UL or UL to DL only when any PRB is not utilized by the victim (i.e. no resource is being utilized) may be considered. Or, change of DL to UL to DL at the resources not used by the victim may be considered. In case victim may perform slot hopping, or hopping within slot, this may cause some issue. Thus, in that case, the first approach may be used as a fallback even second approach is used.

6. Beam Coordination

When multi-beam are used, based on measurements, the networks may identify a list of TX/RX beam pairs which can interfere or have cross-link interference. Intended DL/UL configuration may be negotiated between two cells for the identified TX/RX beam pairs.

FIG. 14 shows an example of beam coordination according to an embodiment of the present invention. Referring to FIG. 14, if there are three cells and here different beam pairs for TX/RX beams are interfering each other, intended DL/UL configuration may be applied per each beam pairs. For example, between TRP1/TRP2, beam in centers may interfere each other, and between TRP1/TRP3, low left beams my interfere each other. The intended DL/UL configuration may be configured independently per each cell or beam pairs (a group of beam pairs may be formed for DL/UL configuration). More specifically, between cells having beam pairs which have potential cross-link interference, intended DL/UL configuration may be configured per each pairs of cells. When a network wants to use a certain TX beam (e.g. beam 1-E of TRP1), then network may need to check whether there is any interfering cells (i.e. paired RX beam in the neighbor cells). Fr example, beam 1-E beam of TRP1 may impact TRP2 and TRP3, and thus, it may follow intended DL/UL configuration.

If intended DL/UL configuration is different between cells, the network may skip using the slot or choose either one (with lower interference pair). If different direction is used, the network may perform sensing or other interference mitigation techniques. For the beam which does not have any binding to neighbor cell for cross-link interference may select the direction randomly. If sidelink is used, different beam may be used. In this sense, sidelink resource may need to be aligned among neighbor cells for the UL resource. In other words, sidelink resource may be configured as a subset of UL resources coordinated among neighbor cells regardless of beam directions. Another approach is to restrict the power of sidelink transmission to minimize the interference to neighbor cells/UEs.

Similarly, broadcast or multicast data or initialization signals which requires beam sweeping or transmissions to multiple directions may be configured as a common DL resource among neighbor cells. In other words, in addition to intended DL/UL configuration between paired cells, DL/UL resources may be configured among neighbor cells which are generally used for broadcast or sidelink operations where controlling beam direction is not easily achievable by the network.

FIG. 15 shows a method for performing sensing by a network node according to an embodiment of the present invention. The disclosure of the present invention described above may be applied to this embodiment.

In step S100, the network node listens on a reservation signal in a sensing gap from a neighbor cell. A length of the sensing gap may be one OFDM symbol or shorter than the one OFDM symbol. The sensing gap may be located between DL resource units and UL resource units. The reservation signal may include at least one of a cell ID or information on which cell transmits the reservation signal. The reservation signal may be transmitted per subband or time/frequency resource.

Upon listening on the reservation signal, in step S110, the network node performs DL transmission to a UE or UL reception from the UE in a cell. If the reservation signal is detected upon listening on the reservation signal, the DL transmission may be performed with a reduced transmission power. In this case, UL transmission may be performed in the neighbor cell after the sensing gap. If the reservation signal is not detected upon listening on the reservation signal, the DL transmission may be performed with a full transmission power. The UL reception may be performed after the sensing gap.

Further, the reservation signal may be listened on per beam direction. In this case, if the reservation signal is detected upon listening on the reservation signal, the network node may change a beam direction.

FIG. 16 shows a wireless communication system to implement an embodiment of the present invention.

A network node 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method for performing sensing by a network node in a wireless communication system, the method comprising:
   listening on a reservation signal in a sensing gap from a neighbor cell; and
   upon listening on the reservation signal, performing downlink (DL) transmission to a user equipment (UE) or uplink (UL) reception from the UE in a cell,
   wherein based on that the reservation signal is detected upon listening on the reservation signal, the DL transmission is performed with a reduced transmission power, and
   wherein based on that the reservation signal is not detected upon listening on the reservation signal, the DL transmission is performed with a full transmission power.

2. The method of claim 1, wherein UL transmission is performed in the neighbor cell after the sensing gap, based on that the reservation signal is detected.

3. The method of claim 1, wherein the UL reception is performed after the sensing gap.

4. The method of claim 1, wherein a length of the sensing gap is one orthogonal frequency division multiplexing (OFDM) symbol or shorter than the one OFDM symbol.

5. The method of claim 1, wherein the sensing gap is located between DL resource units and UL resource units.

6. The method of claim 1, wherein the reservation signal is listened on per beam direction.

7. The method of claim 6, further comprising changing a beam direction, based on that the reservation signal is detected upon listening on the reservation signal.

8. The method of claim 1, wherein the reservation signal includes at least one of a cell identifier (ID) or information on which cell transmits the reservation signal.

9. The method of claim 1, wherein the reservation signal is transmitted per subband or time/frequency resource.

10. A network node configured to operate in a wireless communication system, the network node comprising:
    a memory;
    a transceiver; and
    a processor, coupled to the memory and the transceiver, and that is configured to:

control the transceiver to listen on a reservation signal in a sensing gap from a neighbor cell, and upon listening on the reservation signal, control the transceiver to perform downlink (DL) transmission to a user equipment (UE) or uplink (UL) reception from the UE in a cell, wherein based on that the reservation signal is detected upon listening on the reservation signal, the DL transmission is performed with a reduced transmission power, and wherein based on that the reservation signal is not detected upon listening on the reservation signal, the DL transmission is performed with a full transmission power.

11. The network node of claim 10, wherein UL transmission is performed in the neighbor cell after the sensing gap, based on that the reservation signal is detected.

12. The network node of claim 10, wherein the UL reception is performed after the sensing gap.

13. The network node of claim 10, wherein a length of the sensing gap is one orthogonal frequency division multiplexing (OFDM) symbol or shorter than the one OFDM symbol.

14. The network node of claim 10, wherein the sensing gap is located between DL resource units and UL resource units.

15. The network node of claim 10, wherein the reservation signal is listened on per beam direction.

16. The network node of claim 15, wherein the processor is further configured to change a beam direction, based on that the reservation signal is detected upon listening on the reservation signal.

17. The network node of claim 10, wherein the reservation signal includes at least one of a cell identifier (ID) or information on which cell transmits the reservation signal.

18. The network node of claim 10, wherein the reservation signal is transmitted per subband or time/frequency resource.

19. A computer-readable storage medium storing instructions that, based on being executed by a processor, control a network node to operate in a wireless communication system and to perform operations comprising:

listen on a reservation signal in a sensing gap from a neighbor cell, and upon listening on the reservation signal, perform downlink (DL) transmission to a user equipment (UE) or uplink (UL) reception from the UE in a cell, wherein based on that the reservation signal is detected upon listening on the reservation signal, the DL transmission is performed with a reduced transmission power, and wherein based on that the reservation signal is not detected upon listening on the reservation signal, the DL transmission is performed with a full transmission power.

* * * * *